United States Patent
Lattard et al.

[11] Patent Number: 6,115,413
[45] Date of Patent: Sep. 5, 2000

[54] PROCESS FOR THE TRANSMISSION OF INFORMATION BY PULSE RESPONSE AND THE CORRESPONDING RECEIVER

[75] Inventors: Didier Lattard, Rencurel; Jean-René Lequepeys, Fontaine; Norbert Daniele, Montbonnot; Bernard Piaget, Venon, all of France

[73] Assignee: Commissariat a L'Energie Atomique, Paris, France

[21] Appl. No.: 08/975,459

[22] Filed: Nov. 21, 1997

[30] Foreign Application Priority Data

Dec. 18, 1996 [FR] France ................................ 96 15569

[51] Int. Cl.$^7$ .............................. H04B 15/00; H04K 1/00; H04L 27/30
[52] U.S. Cl. ........................................... 375/200; 375/208
[58] Field of Search ...................................... 375/200, 206, 375/208

[56] References Cited

U.S. PATENT DOCUMENTS

| | | | |
|---|---|---|---|
| 5,609,155 | 3/1997 | Guracar | 600/453 |
| 5,757,845 | 5/1998 | Fukawa et al. | 375/200 |
| 5,768,307 | 6/1998 | Schramm et al. | 375/208 |
| 5,778,022 | 7/1998 | Walley | 375/206 |
| 5,909,462 | 6/1999 | Kamerman et al. | 375/206 |

FOREIGN PATENT DOCUMENTS 0 661 829  7/1995  European Pat. Off. .
0 673 125  9/1995  European Pat. Off. .

*Primary Examiner*—Don N. Vo
*Assistant Examiner*—Phuong Phu
*Attorney, Agent, or Firm*—Oblon, Spivak, McClelland, Maier & Neustadt, P.C.

[57] ABSTRACT

A differential receiver which receives a signal corresponding to transmission of a carrier modulated by symbols $S_k$, where k is an integer designating an order of the symbol, each symbol $S_k$ has a duration Ts and carries information, and the symbols $S_k$ have been multiplied by a psuedorandom sequence. The differential receiver includes a first processing channel configured to receive a first part of the transmitted signal in phase with the carrier to generate samples $I_k$ and delayed samples $I_{k-1}$. The receiver further includes a second processing channel configured to receive a second part of the transmitted signal in phase quadrature with the carrier to generate samples $Q_k$ and delayed samples $Q_{k-1}$. In addition, the receiver includes a multiplication circuit configured to generate a signal Dot(k) equal to $I_k I_{k-1} + Q_k Q_{k-1}$ and a signal Cross(k) equal to $Q_k I_{k-1} - I_k Q_{k-1}$, a calculating mechanism configured to calculate, for each order k of a symbol, the following equation: $E = [Dot(k)^2 + Cross(k)^2]^{1/2}$, and configured to calculate a mean $E^{moy}$, a weighting circuit having two multipliers configured to respectively multiply the signal $E^{moy}$ and the signals Dot(k) and Cross(k) to obtain a mean signal $Dot(k)^{moy}$ and a mean signal $Cross(k)^{moy}$, and a circuit configured to receive the mean signal $Dot(k)^{moy}$ and the mean signal $Cross(k)^{moy}$ supplied by the calculating mechanism to integrate the mean signals on the time of a symbol and restore the corresponding information.

9 Claims, 4 Drawing Sheets

PROCESS FOR THE TRANSMISSION OF INFORMATION BY PULSE RESPONSE AND THE CORRESPONDING RECEIVER

TECHNICAL FIELD

The present invention relates to a process for the transmission of informations by a pulse response and to a corresponding receiver.

It is more particularly used in the transmission of information by the direct sequence spread spectrum method. The invention has a vast range of applications including civil and military fields, telemetry, radiotelephones, telephones without an internal wire, alarm systems, local industrial networks, transportation and in general terms all cases where a transmission takes place in a difficult propagation medium.

PRIOR ART

Although the present invention is not limited to the direct sequence spread spectrum modulation procedure, it will be described in connection therewith.

Direct sequence spread spectrum modulation has been used for many years, particularly in radiocommunications with satellites and in the military sector.

In a digital data transmitter using a conventional modulation technique, modulation takes place of a radio-frequency carrier by a phase, frequency or amplitude modulation. In order to simplify the description, the most widely used phase modulation will be discussed.

The data to be transmitted are bits, which have a period Tb. With the bits, it is possible to form symbols $S_k$ (where k designates the order of the symbol), said symbols having a period Ts. These symbols will modulate the radio-frequency carrier. A symbol can comprise a single bit, in which case Ts=Tb, or can have 2 or more.

The symbols $S_k$ (obtained after differential encoding in the case of a phase differential modulation) are multiplied by a pseudorandom sequence having a bit rate M times higher than the rate of the data to be transmitted. Therefore the duration Tc of the bit or chip of the pseudorandom sequence is equal to Ts/M.

This procedure has numerous advantages:
1. Discretion, which is linked with the spread of the transmitted information over a wide frequency band, leads to a low spectral density of the transmitted power.
2. Multiple access: several direct sequence spread spectrum links can share the same frequency band, if use is made of orthogonal spread pseudorandom sequences (sequences having an intercorrelation function having a very low residual noise for all the shifts). This method which is known by the name code distribution multiple access or CDMA, is difficult to implement, because it imposes a critical management of the transmitted power. Thus, a receiver of one link must not be blinded by a neighbouring transmitter of another link.
3. Cohabitation with conventional narrow band communications: the same frequency band can be shared by systems using a narrow band modulation and those using a broad band modulation. Narrow band communications only suffer from a slight increase in the ambient radio-frequency noise. Spread spectrum modulation communications reject narrow band modulations due to the correlation operation performed on reception.
4. The interception difficulty: a direct sequence spread spectrum transmission is difficult to intercept, bearing in mind the low spectral density and the fact that the receiver must know the spread sequence in order to be able to demodulate the data.
5. The excellent behavior in a multi-path environment: in such an environment, the propagation of the radio-frequency wave takes place along multiple paths, which bring into play reflection, diffraction and diffusion phenomena. Moreover, frequently, there is no direct, stable path in time between the transmitter and receiver. This multiple path propagation induces parasitic effects, which tend to reduce the transmission quality. The main disadvantageous effects are as follows:

The broadening of the pulse response: this effect is linked with the fact that the various paths arriving at the receiver have different group delays. This broadening of the pulse response imposes a limit value for the information rate to be transmitted. The duration of the transmitted symbol must be much greater than the pulse response width in order to obtain an acceptable error rate.

Fading: fading is due to the vector sum which takes place at the receiving antenna. This vector sum can be destructive when the signals received are in phase opposition. These considerable fluctuations of the received level also exist in the case of a fixed point to fixed point link. They are in this case produced by movements of personnel, vehicles, etc. in the radio environment. The procedures conventionally used for obviating this shortcoming are so-called diversity methods. They consist of using several statistically independent signals in order to find the useful information (e.g. several receiving antennas).

Doppler noise: on reception, the Doppler effect gives rise to a frequency shift, which is proportional to the displacement speed and to the cosine of the angle between the speed vector and the electric field associated with the radio-frequency wave. In a multi-path environment, due to the fact that the different paths arrive with random directions, the shift leads to a frequency noise.

However, the excellent behaviour in the fading channels requires the use of a control loop-free asynchronous receiver structure on the highest energy path, as is conventionally the case in spectrum spread communications.

Direct sequence spread spectrum modulation is described in detail in the specialized literature and reference can be made to the following works:

"CDMA Principles of Spread Spectrum Communication" by Andrew J. VITERBI, Addison Wesley Wireless Communications Series, "Spread Spectrum Systems" by Robert C. DIXON, John WILEY and Sons, "Spread Spectrum Communications" by Marvin K. SIMON, Jim K. OMURA, Robert A. SCHOLTZ and Barry K. LEVITT, Computer Science Press, 1983, vol. I.

FIG. 1 gives the simplified block diagram of a spread spectrum receiver in the case where use is made of a differential modulation on transmission. FIG. 1 shows a receiver having an antenna 10, a local oscillator 12, a multiplier 14, an amplifier 16, a matched filter 18, a delay line 20, a multiplier 22, an integrator 24 and a decision circuit 26.

The operating principle of this receiver is as follows. The matched filter 18 performs the correlation operation between the signal received and the spread sequence used for transmitting the data. The phase differential modulation principle chosen on transmission means that the information is carried by the phase difference between the signals at the output of the matched filter 18 and at the output of the delay line 20. This information is restored by the multiplier 22.

With each propagation path corresponds a correlation peak at the output of the multiplier 22. The function of the integrator 24 is to take account of the information supplied by each of the propagation paths. As, in an environment with multiple paths, the propagation paths are statistically independent, with said particular receiver method, there is a diversity base treatment, whose order can be high when the pulse response is complex. The decision circuit 26 makes it possible to recover or salvage the transmitted data and also regenerate the clock.

The difficulty of implementing this direct sequence spread spectrum receiver is due to the delay and matched filtering functions. A conventional solution for implementing these functions consists of using surface sound wave means.

An original method recommends implementing by a single component the two delayed and adapted filtering functions. This component is described in FR-A-2 696 298. The receiver then comprises:

a first correlator ensuring the matched filtering function (correlation between a signal applied to its input and the pseudorandom sequence used on transmission), a second correlator, whose output signal is delayed by a time equal to the time of a transmitted symbol Ts and in this case the delay is produced by the propagation time of the sound wave on the quartz substrate.

Although satisfactory in certain respects, this solution suffers from the following disadvantages:

The pseudorandom sequence is etched on the component substrate in the form of an electrode assembly and is consequently not programmable, so that there is a lack of flexibility.

The insertion losses due to the component are very high (approximately 40 dB), and the losses lead to an increased complexity of the amplifier stage.

This structure of the component limits, for size reasons, the maximum length of the pseudorandom sequences to approximately 511 chips.

Access to the low rate is difficult, in view of the size of the delay line.

Another method for implementing the matched filtering and delay functions has appeared due to advances made in microtechnology. This method makes use of specific digital circuits and reference can, for example be made to the STANDFORD TELECOM STEL2000A circuit.

In this connection, French patent application 95 14322, filed on Dec. 4, 1995, describes a digital circuit whose block diagram is illustrated in FIG. 2. This receiver comprises two identical channels, one for treating the part I of the signal in phase with the carrier and the other for treating the part Q in quadrature with the same carrier.

The channel I incorporates a first, matched filtering means 50(I), able to fulfil a first filtering function corresponding to the pseudorandom sequence used on transmission, the first means supplying samples $I_k$. The channel I also has a first delay means 60(I) able to fulfil a first delay function having a duration equal to the period Ts of the symbols and supplying samples $I_{k-1}$.

The channel Q has a second, matched filtering means 50(Q), which is able to fulfil a second filtering function, still corresponding to the pseudorandom sequence, the second means supplying samples $Q_k$. The channel Q also incorporates a second delay means 60(Q) able to fulfil a delay function with a duration Ts and supplying samples $Q_{k-1}$.

The multiplier 70 supplies combinations of products of these samples and in particular a signal Dot(k), which is equal to $I_k I_{k-1} + Q_k Q_{k-1}$ and a signal Cross(k) equal to $Q_k I_{k-1} - I_k Q_{k-1}$. The circuit of FIG. 2 is completed by a programming means 72.

In order to illustrate the interest of the signals Dot(k) and Cross(k), it is pointed out that a carrier of pulsation w, phase modulated by a function P(t), leads to a modulated signal s(t), which can be written in the form: s(t)=A(t)cos[wt+P(t)] in which A(t) represents the amplitude of the signal. This expression can be developed into:

$$s(t)=A(t)\cos wt \cos P(t)-A(t)\sin wt \sin P(t).$$

By designating the signal in phase with the carrier I(t)=A(t)cosP(t) and the signal in quadrature with the carrier Q(t)=A(t)sinP(t), the signal s(t) can be expressed in the form: s(t)=I(t)coswt−Q(t)sin wt.

On passing into the complex field, the signal s(t) can be written in complex form:

$$S(t)=U(t)\exp(jwt) \text{ with } U(t)=I(t)+jQ(t).$$

The real signal s(t) is the real part of the complex signal S(t). Thus, the processing of the signal s(t) can take place by processing the two signals I(t) and Q(t), which will be designated I and Q hereinafter. These two signals are called base band signals. They can easily be obtained by multiplication between the signal received and a signal in phase with the carrier (for I) and a signal in quadrature with the carrier (for Q).

In a link where a differential modulation is used, on reception the demodulator must effect the product of the sample $S_k$ obtained at time t and the conjugate sample of $S_{k-1}$ obtained at time t−Ts, where Ts is the duration of the symbols. This product can be developed as follows:

$$(I_k+jQ_k)\times(I_{k-1}+jQ_{k-1})^*=I_k I_{k-1}+Q_k Q_{k-1}+j(Q_k I_{k-1}-I_k Q_{k-1})=\text{Dot}(k)+j\text{Cross}(k)$$

with Dot(k)=$I_k I_{k-1}+Q_k Q_{k-1}$ and Cross(t)=$Q_k I_{k-1}-I_k Q_{k-1}$

It is the function of the circuit 70 to form the signals Dot(k) and Cross(k) from samples $I_k$, $I_{k-1}$, $Q_k$, $Q_{k-1}$, the signals carrying the sought information.

The solution described hereinbefore does not solve the general problem of such a receiver, which is due to the fact that at the output of the demodulator, the signal which appears represents either a signal proportional to the energy carried on a given propagation path (energy equal to the square of the amplitude of the echo received) or noise.

The integration processing performed in a known differential receiver consequently corresponds to the sum of not only the energies carried by all the propagation paths, but also signals not representing propagation paths, which leads to a deterioration of the signal-to-noise ratio. In other words, in this procedure, there is no separation of the correlation peaks.

However, a procedure has been conceived in order to attempt to overcome the noise existing between the correlation peaks. This is the so-called RAKE procedure. It consists of isolating a certain number of propagation paths and adding solely the energies carried by these paths. In this approach, a certain number of matched filters (correlators) make it possible to sense a channel and therefore position the teeth of the "rake", whilst other correlators make it possible to track the highest energy paths. A processing then makes it possible to summate the squares of the amplitudes of the paths retained.

In RAKE-type architectures using a coherent modulation, reference can be made to the article entitled "ASIC Implementation of a Direct Sequence Spread Spectrum RAKE Receiver" by Stephen D. LINGWOOD, Hans KAUFMANN, Bruno HALLER, published in IEEE Vehicular Technology Conference VTC'94, Stockholm, Jun. 1994, pp 1 to 5.

However, this solution again suffers from disadvantages.

In practical terms, only a limited number of propagation paths can be tracked (2 to 4 in the known constructions). In the case of a long pulse response leading to the appearance of a large number of different paths, the diversity order (i.e. the number of simultaneously processed, statistically independent informations) is consequently limited. Use is not made of all the information carried by the transmission channel.

The correlators making it possible to sense the channel in order to position the teeth of the rake must have a very considerable agility to be able to adapt to possible rapid variations of the transmission channel (coherent modulation).

In order to attempt to obviate these disadvantages, it is necessary to reconsider the nature of the signal to be processed and to attempt to imagine a satisfactory processing. In the case of a so-called differential phase shift keying or DPSK, only the Dot(k) signal has to be analyzed in order to find the transmitted data. However, the Cross(k) signal can be used for carrying out an automatic frequency control.

FIG. 3 shows the configuration of a Dot signal obtained by simulation, in the case where there is only a single propagation path between transmitter and receiver. The peaks shown are sometimes positive and sometimes negative, as a function of the transmitted binary information value. The interval between two consecutive peaks corresponds to the duration Ts of a symbol.

In the case of a differential quaternary phase shift keying or DQPSK, the two Dot and Cross signals must be simultaneously examined in order to find the transmitted data.

FIGS. 4 and 5 respectively give the configuration of the Dot and Cross signals obtained by simulation in the case of a single path.

In the case of several paths, the peaks illustrated in FIGS. 3 to 5 will be double, triple, quadruple, etc., for each symbol, the number of detected peaks being equal to the number of paths taken by the radio-frequency wave between transmitter and receiver.

A simple integrator, such as the integrator 24 of FIG. 1, integrated into the circuit 90 of FIG. 2, will integrate all the signals present, i.e. both the peaks (corresponding to a real information) and the noise (corresponding to no information). Therefore the signal-to-noise ratio is low.

The object of the present invention is to obviate this disadvantage and improve this ratio.

DESCRIPTION OF THE INVENTION

The invention is based on the observation according to which the signal obtained by taking the sum of the squares of the signals Dot(k) and Cross(k), then extracting the square root of said sum, directly reflects the energy distribution of the different propagation paths, each peak having for its amplitude the energy carried by the corresponding path. Thus, according to the invention, measurement then takes place of a quantity E(k) defined by:

$$E(k)=[Dot(k)^2+Cross(k)^2]^{1/2}.$$

According to another feature of the invention, an averaging operation of the energy E(k) takes place on a few symbols, i.e. on a few values of order k. The number N of symbols taken into account for this estimate of the average must correspond to a duration shorter than the coherence time of the channel, i.e. to the time beyond which two separate waves of the same origin will no longer interfere. It is assumed that on a duration equal to N times the duration Ts of a symbol, the transmission channel maintains its coherence properties (so-called stationarity hypothesis).

With the aid of this average $E^{moy}$, the instantaneous signals Dot(k) and Cross(k) are weighted, e.g. by simply multiplying Dot(k) and Cross(k) by the value $E^{moy}$. Thus, this leads to two new, weighted signals, i.e. $Dot(k)^{moy}$ and $Cross(k)^{moy}$. It is on these weighted signals, reflecting the average of the energy on several symbols, that will then take place the integration treatment on a period Ts of the symbol, followed by the regeneration of the clock and the salvaging of the data.

The averaging of the instantaneous output makes it possible to retain, on the outputs $Dot^{moy}$ and $Cross^{moy}$, the peaks corresponding to propagation paths (taking account of the proved stationarity hypothesis of the channel on the few symbols used) and very significantly reduce the noise level generated by the electromagnetic environment, a frequency shift or a phase rotation.

Thus, the invention leads to the following advantages:
  improvement of the signal-to-noise ratio of the outputs $Dot^{moy}$ and $Cross^{moy}$ prior to the stages of integration, clock recovery and transmitted binary data restoration,
  taking into account of all the energies of all the propagation paths (unlike in RAKE-type architectures),
  simple obtaining of an estimate of the pulse response of the transmission channel, without limitation to a certain number of paths considered to be the highest energy.

The invention has been defined hereinbefore in the context of direct sequence spread spectrum, but is not limited thereto. It is in fact applicable to all types of link involving pulse-type phenomena, where the information is received in the form of several time-shifted answers, the transmission channel obeying a stationarity rule on a few periods of transmitted symbols.

More specifically, the present invention relates to a process for improving the information transmission by pulsed response of a transmission channel, the process consisting of transmitting information symbols through a transmission channel, which has several possible paths, which gives rise to several signals received for a same transmitted information symbol, said channel being stable for a time equal to several periods of transmitted information symbols, said process being characterized in that a calculation takes place of the energy of said signals received during said stability time of the channel, followed by an averaging of said energy during said stability time, the signals received are weighted by the average energy and said weighted signals are processed in order to restore the information.

According to a variant of this process, on transmission, a phase differential modulation and a direct sequence spread spectrum takes place and, on reception, the transmitted signal is received, a matched filtering being performed on the sequence used on transmission in order to produce correlation signals, said correlation peaks are delayed by a time equal to the period of the information symbols, from the correlation signals and delayed signals are produced peaks, each of which reflects the information carried along the particular path of the channel, said process being characterized in that a calculation takes place of the energy of said peaks, the average of said energy is formed on several symbols, said peaks are weighted by the calculated average and the weighted peaks are processed in order to restore the information carried by each symbol.

The invention also relates to a receiver for performing the process defined hereinbefore. This receiver comprises the means described in connection with FIG. 2 and is characterized in that it also comprises:

d) calculating means for calculating, for each order k of a symbol, the squares of the signals Dot(k) and Cross (k), in order to form the sum of these squares, for extracting the square root of said sum, i.e. $E=[Dot(k)^2+Cross(k)^2]^{1/2}$, for then calculating the mean $E^{moy}$ of said quantity on N successive symbols, N being a defined integer, and finally for weighting each signal Dot(k) and Cross(k) by the previously calculated mean $E^{moy}$, in order to obtain a mean signal $Dot(k)^{moy}$ and a mean signal $Cross(k)^{moy}$, e) a circuit receiving the mean signal $Dot(k)^{moy}$ and the mean signal $Cross(k)^{moy}$ supplied by the calculating means, said circuit being able to integrate these mean signals on the time of a symbol and restore the corresponding information.

DETAILED DESCRIPTION OF AN EMBODIMENT

Figure 1:
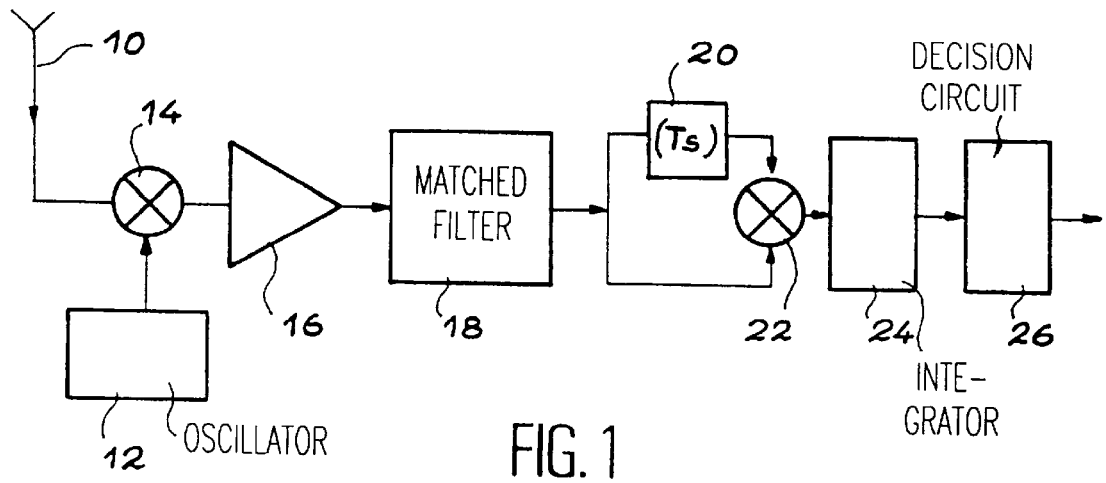
FIG. 1, already described, illustrates a known receiver for direct sequence spread spectrum differential transmission.
Figure 2:
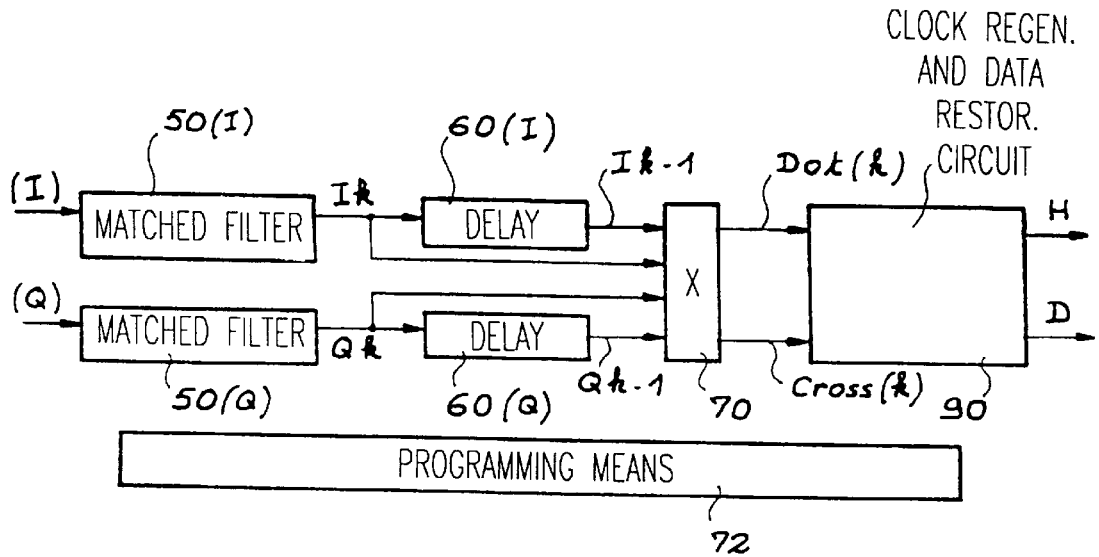
FIG. 2, already described, illustrates a known digital circuit for processing signals I and Q.
Figure 3:
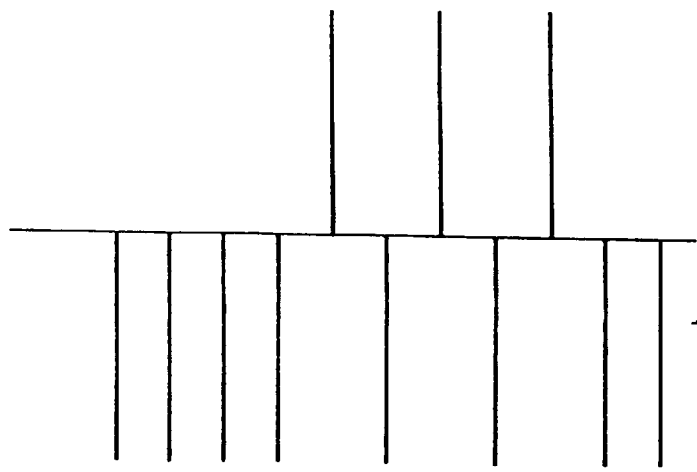
FIG. 3, already described, shows the configuration of a signal Dot in the case of a differential phase shift keying (DPSK).
Figure 4:
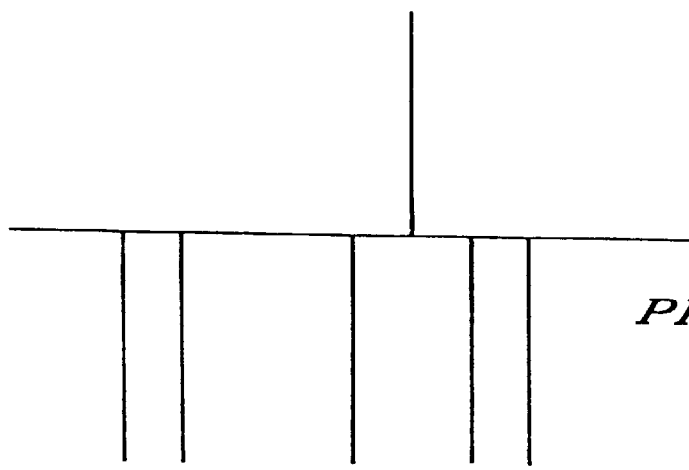
FIG. 4, already described, shows the configuration of a signal Dot in the case of a differential quadrature phase shift keying (DQPSK).
Figure 5:
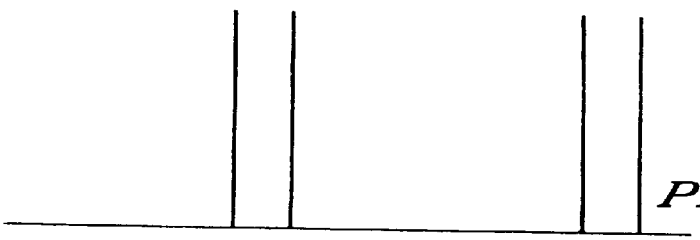
FIG. 5, already described, shows the configuration of a signal Cross in the case of a differential quadrature phase shift keying (DQPSK).
Figure 6:
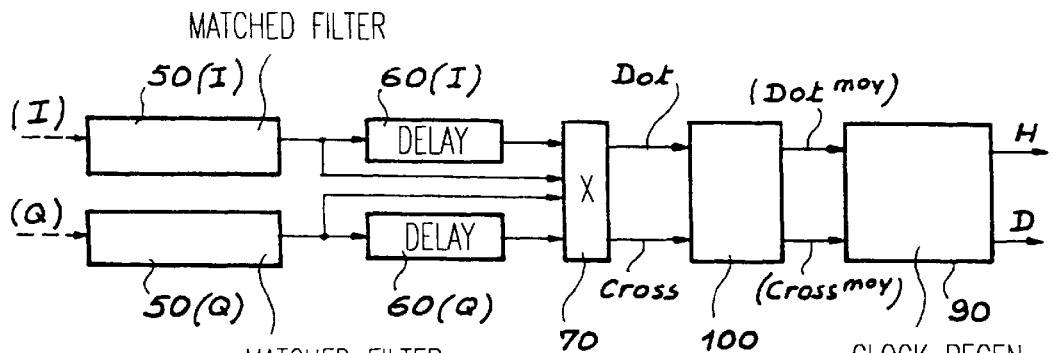
FIG. 6 shows the block diagram of a receiver according to the invention.

FIG. 6 shows a receiver according to the invention. This receiver includes the device already described relative to FIG. 2 with the same numerical references. According to the invention, the receiver also includes a circuit 100 positioned between the multiplier 70 and the clock regeneration and data restoration circuit 90.

Figure 7:
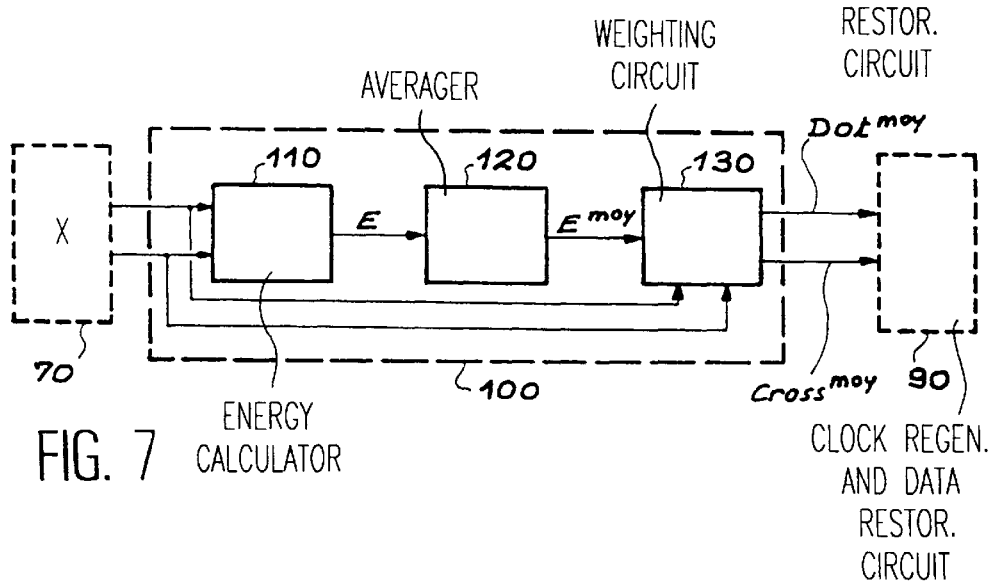
FIG. 7 shows the block diagram of mechanism permitting the calculation of the energy, the mean value and the weighting operation.

The structure of this circuit 100 is illustrated in FIG. 7. It includes a circuit 110 for calculating the energy E, a circuit 120 for calculating the mean $E^{moy}$ and a circuit 130 for weighting the signals Dot and Cross (hereinafter for simplification reasons the rank or order k is omitted in the notations). The circuit 110 receives the signals Dot and Cross from the preceding circuit 70 and the circuit 130 supplies the signals weighted by the mean value, i.e. $Dot^{moy}$ and $Cross^{moy}$, the weighted signals are then applied to the circuit 90.

Figure 8:
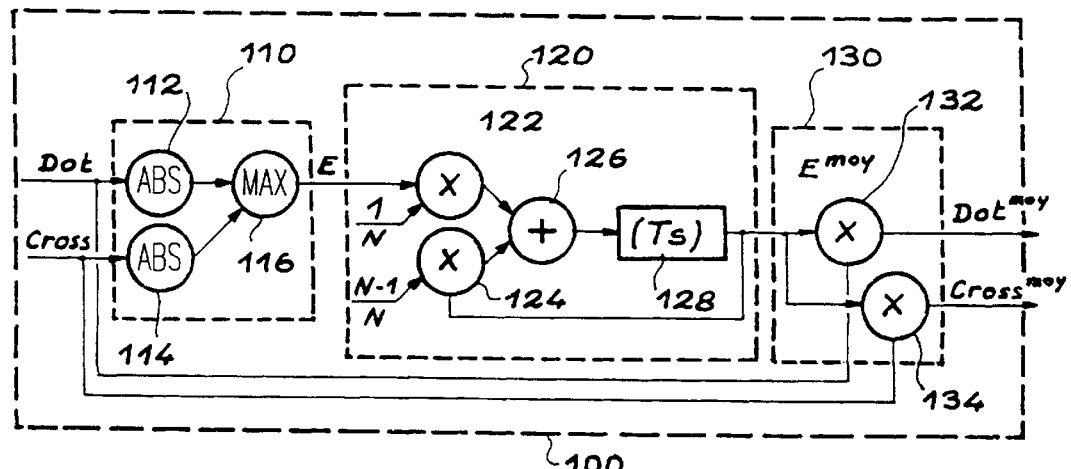
FIG. 8 illustrates an embodiment of a circuit able to determine the energy, form the mean therefrom and perform a weighting.

FIG. 8 illustrates a possible embodiment of these circuits. The energy E can be estimated by a determination of the maximum of the absolute values of the signals Dot and Cross. For this purpose, the circuit 110 incorporates two circuits 112 and 114 for determining these absolute values and a circuit 116 for determining the maximum assumed by these absolute values.

The calculation of the average or mean $E^{moy}$ can take place by a recursive filter defined by its Z transform:

$$H(Z)=(1/N)E+((N-1)/N)Z^{-M},$$

in which N defines a number of symbols corresponding to a time shorter than the coherence time of the transmission channel and M the number of chips of the pseudorandom sequence. Thus, the term Z corresponds to the duration Ts of a symbol. Consequently the circuit 120 includes a first multiplier 122 receiving the value E and the value 1/N, a second multiplier 124 receiving the value (N−1)/N, an adder 126 and a delay line 128 of a duration equal to the period Ts of one symbol, with the delay line being relooped on the multiplier 124. Thus, the circuit adds N successive signals and divides said sum by N, which corresponds to the sought mean and which is available at the output of the delay line 128.

Weighting can take place simply by two multiplications:

$$Dot^{moy}=Dot \times E^{moy}$$

$$Cross^{moy}=Cross \times E^{moy}.$$

To this end, the circuit 130 includes on the one hand a first multiplier 132 receiving $E^{moy}$ and the signal Dot and supplying $Dot^{moy}$ and on the other hand a second multiplier 134 receiving $E^{moy}$ and the signal Cross and supplying $Cross^{moy}$.

Figure 9A:
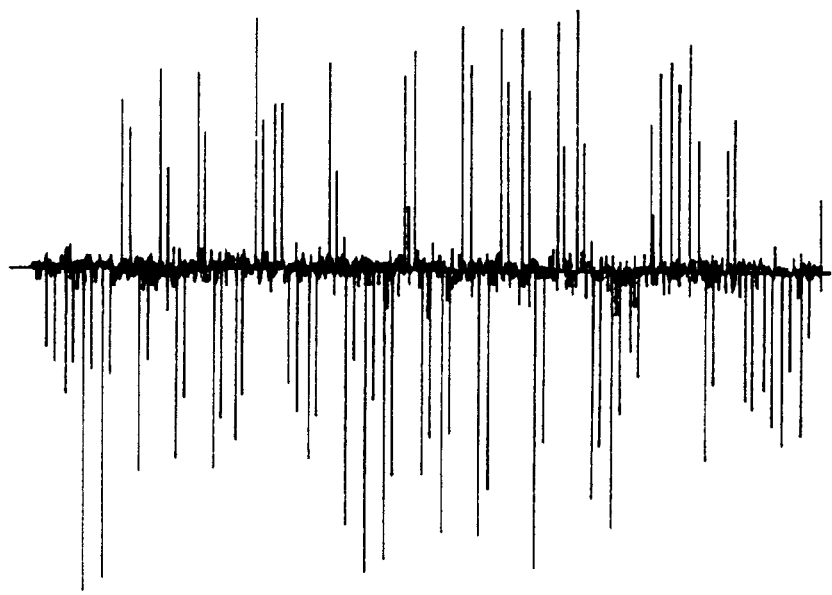
FIGS. 9A and 9B show the signal Dot (in the case of a DPSK modulation) according to the prior art (9A) and according to the invention (9B).
Figure 9B:
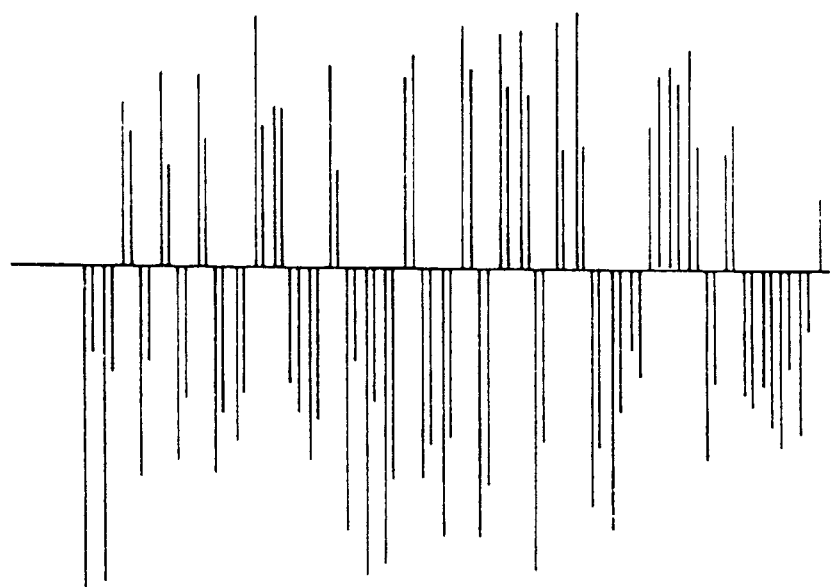

FIGS. 9A and 9B show the results obtained by simulation in the case of a DPSK modulation. FIG. 9A shows the signal Dot with its noise and FIG. 9B shows same signal after weighting, i.e. the signal $Dot^{moy}$. It can be seen that the noise appearing between the correlation peaks is greatly reduced and that the signal-to-noise ratio is considerably improved.

What is claimed is:

1. A differential receiver which receives a signal corresponding to transmission of a carrier modulated by symbols $S_k$, where k is an integer designating an order of the symbol, each symbol $S_k$ has a duration Ts and carries information, and the symbols $S_k$ have been multiplied by a psuedorandom sequence, the differential receiver comprising:

a first processing channel configured to receive a first part of the transmitted signal in phase with the carrier, said first channel having a first matched filter configured to filter the first part of the transmitted signal based on the pseudorandom sequence to generate samples $I_k$, and a first delay mechanism configured to perform a first delay function of a duration Ts to generate delayed samples $I_{k-1}$;

a second processing channel configured to receive a second part of the transmitted signal in phase quadrature with the carrier, said second channel having a second matched filtering configured to filter the second part of the transmitted signal based on the pseudorandom sequence to generate samples $Q_k$, and a second delay mechanism configured to perform a delay function of a duration Ts to generate delayed samples $Q_{k-1}$;

a multiplication circuit configured to generate a signal Dot(k) equal to $I_k I_{k-1}+Q_k Q_{k-1}$ and a signal Cross(k) equal to $Q_k I_{k-1}-I_k Q_{k-1}$;

a calculating mechanism configured to calculate, for each order k of a symbol, the following equation:

$$E=[Dot(k)^2+Cross(k)^2]^{1/2},$$

and configured to calculate a mean $E^{moy}$ of the quantity E on N successive symbols, N being defined as an integer;

a weighting circuit having two multipliers configured to respectively multiply $E^{moy}$ and the signals Dot(k) and Cross(k) to obtain a mean signal $Dot(k)^{moy}$ and a mean signal $Cross(k)^{moy}$; and a circuit configured to receive the mean signal $Dot(k)^{moy}$ and the mean signal $Cross(k)^{moy}$ and configured to integrate the mean signals on the time of a symbol and restore the corresponding information.

2. The receiver according to claim 1, wherein the calculating mechanism includes first and second mechanisms configured to respectively determine absolute values of the signals Dot(k) and Cross(k) and a third mechanism configured to calculate a maximum of the absolute values.

3. The receiver according to claim 1, wherein the calculating mechanism includes at least one recursive filter.

4. A method for receiving a signal corresponding to transmission of a carrier modulated by symbols $S_k$, where k is an integer designating an order of the symbol, each symbol $S_k$ has a duration Ts and carries information, and the symbols $S_k$ have been multiplied by a psuedorandom sequence, the method comprising:

receiving a first part of the transmitted signal in phase with the carrier;

filtering the first part of the transmitted signal based on the pseudorandom sequence to generate samples $I_k$;

performing a first delay function of a duration Ts to generate delayed samples $I_{k-1}$;

receiving a second part of the transmitted signal in phase quadrature with the carrier;

filtering the second part of the transmitted signal based on the pseudorandom sequence to generate samples $Q_k$;

performing a delay function of a duration Ts to generate delayed samples $Q_{k-1}$;

generating a signal Dot(k) equal to $I_k I_{k-1}+Q_k Q_{k-1}$ and a signal Cross(k) equal to $Q_k I_{k-1}-I_k Q_{k-1}$;

calculating, for each order k of a symbol, the following equation:

$$E=[Dot(k)^2+Cross(k)^2]^{1/2};$$

calculating a mean $E^{moy}$ of the quantity E on N successive symbols, N being defined as an integer;

multiplying the signal $E^{moy}$ and the signals Dot(k) and Cross(k) to obtain a mean signal $Dot(k)^{moy}$ and a mean signal $Cross(k)^{moy}$; and integrating the mean signal $Dot(k)^{moy}$ and the mean signal $Cross(k)^{moy}$ on the time of a symbol to restore the corresponding information.

5. The method according to claim 4, wherein the step of calculating the quantity E determines absolute values of the signals Dot(k) and Cross(k) and calculates a maximum of the absolute values.

6. The method according to claim 4, wherein the step of calculating the mean $E^{moy}$ includes at least one recursive filter.

7. A system for receiving a signal corresponding to transmission of a carrier modulated by symbols $S_k$, where k is an integer designating an order of the symbol, each symbol $S_k$ has a duration Ts and carries information, and the symbols $S_k$ have been multiplied by a psuedorandom sequence, the method comprising:

means for receiving a first part of the transmitted signal in phase with the carrier;

means for filtering the first part of the transmitted signal based on the pseudorandom sequence to generate samples $I_k$;

means for performing a first delay function of a duration Ts to generate delayed samples $I_{k-1}$;

means for receiving a second part of the transmitted signal in phase quadrature with the carrier;

means for filtering the second part of the transmitted signal based on the pseudorandom sequence to generate samples $Q_k$;

means for performing a delay function of a duration Ts to generate delayed samples $Q_{k-1}$;

means for generating a signal Dot(k) equal to $I_k I_{k-1}+Q_k Q_{k-1}$ and a signal Cross(k) equal to $Q_k I_{k-1}-I_k Q_{k-1}$;

means for calculating, for each order k of a symbol, the following equation:

$$E=[Dot(k)^2+Cross(k)^2]^{1/2};$$

means for calculating a mean $E^{moy}$ of the quantity E on N successive symbols, N being defined as an integer;

means for multiplying the signal $E^{moy}$ and the signals Dot(k) and Cross(k) to obtain a mean signal $Dot(k)^{moy}$ and a mean signal $Cross(k)^{moy}$; and means for integrating the mean signal $Dot(k)^{moy}$ and the mean signal $Cross(k)^{moy}$ on the time of a symbol to restore the corresponding information.

8. The system according to claim 7, wherein the means for calculating the quantity E determines absolute values of the signals Dot(k) and Cross(k) and calculates a maximum of the absolute values.

9. The system according to claim 7, wherein the means for calculating the mean $E^{moy}$ includes at least one recursive filter.

* * * * *